United States Patent [19]

Burge

[11] Patent Number: 5,535,414
[45] Date of Patent: Jul. 9, 1996

[54] SECONDARY DATA TRANSFER MECHANISM BETWEEN COPROCESSOR AND MEMORY IN MULTI-PROCESSOR COMPUTER SYSTEM

[75] Inventor: Benjamin D. Burge, Shaker Hts., Ohio

[73] Assignee: International Business Machines Corporation, Armonk, N.Y.

[21] Appl. No.: 975,860

[22] Filed: Nov. 13, 1992

[51] Int. Cl.⁶ .................................................. G06F 13/00
[52] U.S. Cl. ........................ 395/827; 395/847; 395/280; 395/154; 364/240.2; 364/228.6; 364/DIG. 1
[58] Field of Search ..................................... 395/275, 575, 395/425, 375, 827, 847, 894, 280, 154

[56] References Cited

U.S. PATENT DOCUMENTS

| | | |
|---|---|---|
| 4,245,300 | 1/1981 | Kaufman et al. . |
| 4,283,760 | 8/1981 | Kaita et al. . |
| 4,455,620 | 6/1984 | Wantanabe et al. ............... 364/900 |
| 4,688,166 | 8/1987 | Schneider .......................... 364/200 |
| 4,716,525 | 12/1987 | Gilanyi et al. ..................... 395/250 |
| 4,821,170 | 4/1989 | Bernick et al. .................... 395/275 |
| 4,864,532 | 9/1989 | Reeve et al. ...................... 395/250 |
| 4,965,801 | 10/1990 | DuLac ............................... 395/275 |
| 4,975,832 | 12/1990 | Saito et al. ........................ 364/200 |
| 5,025,412 | 6/1991 | Dalrymple et al. ................ 395/278 |
| 5,068,785 | 11/1991 | Sugiyama .......................... 395/325 |
| 5,073,854 | 12/1991 | Martin et al. ...................... 395/425 |
| 5,081,578 | 1/1992 | Davis ................................. 395/325 |
| 5,099,417 | 3/1992 | Mager et al. ...................... 395/847 |
| 5,109,506 | 4/1992 | Begun ................................ 395/575 |
| 5,142,626 | 8/1992 | Arnold et al. ..................... 395/275 |
| 5,159,671 | 10/1992 | Iwami ................................ 395/250 |
| 5,179,713 | 1/1993 | Catlin et al. ....................... 395/800 |
| 5,226,165 | 7/1993 | Martin ............................... 395/600 |
| 5,257,393 | 10/1993 | Miller ................................ 395/800 |
| 5,265,211 | 11/1993 | Amini et al. ...................... 395/827 |
| 5,276,845 | 1/1994 | Takayama ......................... 395/847 |
| 5,276,864 | 1/1994 | Hernandez et al. ............... 395/575 |
| 5,283,819 | 2/1994 | Glick et al. ........................ 379/90 |
| 5,339,413 | 8/1994 | Koval et al. ....................... 395/650 |
| 5,359,614 | 10/1994 | Pattisam et al. ................... 395/250 |
| 5,371,860 | 12/1994 | Mura et al. ........................ 395/325 |
| 5,381,538 | 1/1995 | Amini et al. ...................... 395/425 |
| 5,390,304 | 2/1995 | Leach et al. ....................... 395/375 |
| 5,392,404 | 2/1995 | Thompson ......................... 395/275 |
| 5,398,324 | 3/1995 | Matida et al. ..................... 395/425 |

OTHER PUBLICATIONS

IBM Technical Disclosure Bulletin, vol. 34, No. 6, Nov. 1991.

*Primary Examiner*—Christopher B. Shin
*Attorney, Agent, or Firm*—Calfee Halter & Griswold

[57] ABSTRACT

A computer system having a CPU, a memory subcircuit, a peripheral subcircuit, a primary SCSI controller, which generates a SCSI bus, a coprocessor, and a secondary SCSI controller, also attached to the SCSI bus. These components are operatively connected in such a way that the coprocessor can access the SCSI bus through the secondary SCSI controller without interfering with the CPU's ability either to run a program from the memory subcircuit or to receive data and control input from the peripheral subcircuit.

18 Claims, 3 Drawing Sheets

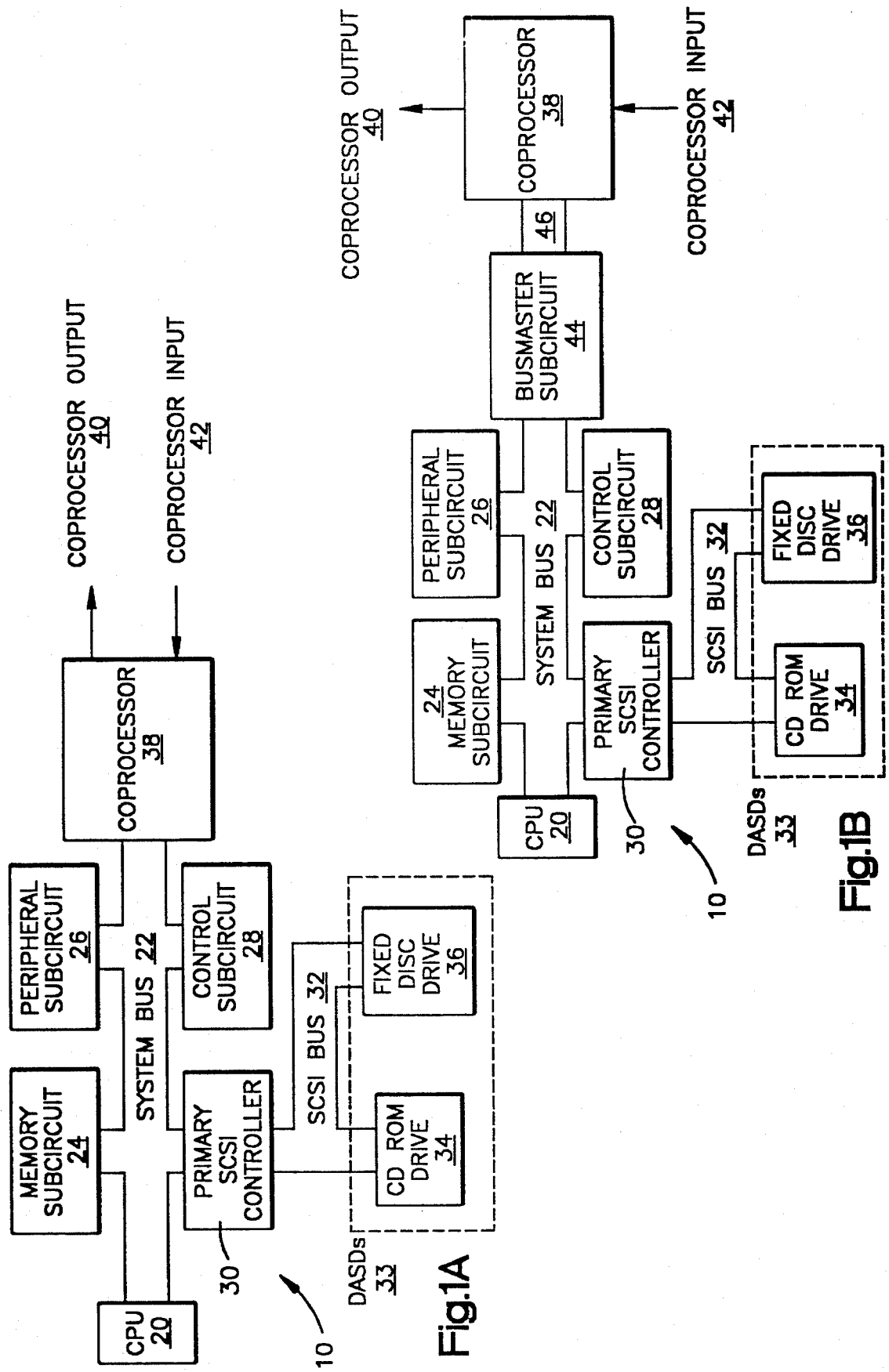

SECONDARY DATA TRANSFER MECHANISM BETWEEN COPROCESSOR AND MEMORY IN MULTI-PROCESSOR COMPUTER SYSTEM

FIELD OF THE INVENTION

The present invention relates generally to computer system architecture and, more specifically, to a multimedia personal computer system with a CPU and a coprocessor, each having a SCSI controller associated therewith giving each access to a single SCSI bus, thereby freeing up the CPU, the system bus, and other system resources during large data transfers.

BACKGROUND OF THE INVENTION

Personal computer systems are well known in the art. Personal computer systems in general, and IBM Personal Computers in particular, have attained wide spread use for providing computer power to many segments of today's modern society. Personal computers can typically be defined as a desktop, floor standing, or portable microcomputer that is comprised of a system unit having a single central processing unit (CPU) and associated volatile and non-volatile memory, including all RAM and BIOS ROM, a system monitor, a keyboard, one or more flexible diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small business. Examples of such personal computer systems are IBM's PERSONAL COMPUTER AT and IBM's PERSONAL SYSTEM/2 Models 25, 30, L40SX, 50, 55, 65, 70, 80, 90 and 95.

In computer systems, the components communicate via electrical signals. These electrical signals are typically carried by electrical connections between the system components. Typical types of electrical connections include metal traces on a printed circuit board, vias, plated through holes, plugs, and individual wires wrapped from pin to pin of system components. Typically groups of electrical signals and groups of electrical connections that carry the electrical signals are referred to as a "bus." Thus, a reference to a "bus" can indicate a reference to a group of electrical signals, a group of electrical connections that carry the electrical signals, or a reference to both a group of electrical signals that form a protocol and a group of electrical connections that carry the electrical signals.

Personal computer systems are typically used to run software to perform such diverse activities as word processing, manipulation of data via spread-sheets, collection and relation of data in databases, displays of graphics, design of electrical or mechanical systems using system-design software, etc.

One relatively recent use of the personal computer is that of the so called "multimedia" system. In a multimedia system, the personal computer is used to present a video presentation, an audio presentation, an audio/visual presentation, or a networking signal for computer networks. For example, in a very simple multimedia system, the user of the personal computer could listen to music from an audio compact disk (CD) while working on a document in a spreadsheet program running on the same computer. In more complex examples, the personal computer is used to present a real-time audio/visual presentation, such as a marketing presentation for a company, or is used as a server, which requires it to generate a network signal without any intervention from the user.

One characteristic of multimedia systems is the requirement that the computer system access large volumes of data from a direct access storage device (DASD), such as a fixed disk drive or a CD peripheral. In general, a multimedia presentation that is more complex will require more data being accessed from the DASD than a simpler multimedia presentation. Therefore, as multimedia presentations become more complex, multimedia systems must transfer larger and larger amounts of data from the DASDs.

The major problem with current multimedia personal computer systems is that they are not designed to simultaneously run complex programs by the CPU in system memory and transfer the large blocks of data needed to present real-time multimedia presentations.

In early multimedia computer systems, the transfer of data between the DASD and the computer system was done by the system CPU. This allowed presentations similar to "slide shows" to be presented, but did not allow anything close to real-time audio/visual presentations, similar to television programs, to be presented. It became apparent early in the development of multimedia systems that for a real-time system to work effectively, something other than the CPU would need to be used to make the presentations.

One common way of reducing the overhead to the CPU in multimedia systems is to add a coprocessor to the system. A coprocessor is typically either a microprocessor, similar to the CPU, or a digital signal processor (DSP), tied to the CPU. Coprocessors typically differ from CPUs in that the CPU is typically designed to run operating systems, such as IBM's PC-DOS and OS/2, and programs designed to run on those operating systems. Further, the CPU will typically issue commands to the coprocessor, which will then execute the command. Moreover, the coprocessor is typically optimized to perform one or more specific functions. A very common example of a coprocessor optimized to perform a specific function is an arithmetic coprocessor, such as the Intel 80387, which is used to reduce the amount of overhead of the CPU in performing mathematical operations. More specific to multimedia systems are specific coprocessors designed to handle video, audio, or network signals or VGA or XGA cards. Audio and video data are usually compressed to minimize the amount of space needed on a DASD to store the data. Consequently, one very common function of audio and video coprocessors is the decompression function by which the compressed audio and video data are decompressed and then electrically transformed from digital data to the analog data. An example of such a coprocessor is Intel's DVI chipset. Another type of coprocessor is IBM's XGA chipset which provides accelerated picture drawing.

Using coprocessors to reduce the overhead of the CPU has proven to be very helpful in producing systems capable of producing more realistic audio/visual presentations. However, this solution has not produced systems capable of simultaneously running programs in system memory while transferring the large blocks of data needed to present real-time audio/visual presentations. Although the CPU is not involved in the decompression and manipulation of the audio and/or video data in the system with a coprocessor, the CPU still is involved in the data transfer from the DASD to the coprocessor. Consequently, adding a coprocessor is not, by itself, enough to free up the CPU while presenting real-time presentations except in the simplest of instances.

For example, the computer operator listening to music from a CD while running a program on the computer system would notice either the CD music stopping while the computer is running the program or the computer program stopping while the system accesses the DASD to get the large amount of data needed to play the music.

Several attempts to further reduce the overhead on the CPU have been attempted. Various computer architectures have been designed in an attempt to minimize the amount of overhead of the CPU for any given transfer of data. One such example is the use of a direct memory access (DMA) system. In this system, a DMA subcircuit essentially takes control of the system bus, allowing a higher number of data transfers per second to be performed than if the CPU is performing the same transfer. Obviously if the DMA controller has control of the system bus, the CPU must halt any activity.

A more recent computer architecture used to ease the overhead of the CPU involves the use of the coprocessor as a busmaster. In a busmaster system, the busmaster arbitrates control of the system bus between one or more system components. For example, once the coprocessor becomes the busmaster, the CPU relinquishes control of the system buss the coprocessor takes control of the system bus, and the coprocessor then performs the data transfers as though the coprocessor is the CPU. Again, similar to a DMA system, in a busmaster system the CPU isolates itself from the system bus, preventing it from performing any meaningful activity while the data is being transferred from the DASD to the coprocessor. The inactivity of the CPU can have the effect of either interrupting the computer program being run by the CPU or interrupting the audio/visual presentation being shown by the coprocessor or slowing down the network being served by the computer system.

Thus, although the use of DMA and busmaster systems allow a faster transfer of data between the DASD and the coprocessor, both methods tie up the CPU during DASD accesses, preventing the system from being able to transfer the data needed to present real-time audio/visual presentations or act as a server while the CPU runs a program in the system memory.

It is therefore an object of the present invention to provide a multimedia computer system that does not tie up the CPU or system bus during data transfers.

It is a further object of the present invention to provide a circuit that allows the coprocessor of a multimedia computer system to access a direct access storage device without requiring the CPU to either make the transfers or to release the system bus.

SUMMARY OF THE INVENTION

According to the present invention, the coprocessor of a multimedia computer system is given its own SCSI controller, whereby the coprocessor may access the DASD without requiring the CPU to make the transfers, without requiring the CPU to relinquish control of the system bus, and without requiring the main SCSI controller to make the transfer. The secondary SCSI controller allows the coprocessor to access the DASD without assistance from or interference by the CPU.

Typically, the CPU will issue a high-level command to the coprocessor and the CPU will then neither monitor the coprocessor's progress nor assist the coprocessor in any way. The coprocessor will accept the instruction from the CPU, instruct the secondary SCSI controller to make any needed transfers to or from the DASD via the SCSI bus, receive the data from the secondary SCSI controller, and perform the requested task, such as decompressing the audio data and generating the analog audio signal from the digital data.

The figures and text of this application refer to the transfer bus, through which data passes to and from the DASDs, as a SCSI bus, that is, a bus meeting the Small Computer System Interface Standard. The structure of the SCSI bus, and its associated protocols, are defined by the American National Standards Institute (ANSI X3T9.2). The preferred embodiment of this invention does envision a SCSI bus as the transfer bus. However, the scope of this invention is broader than that. The transfer bus, under this invention, encompasses any and all buses, serial or parallel, in which data transfers may be initiated by more than one controller on the bus. For example, the general purpose interface bus (GPIB), standardized in IEEE-488, and IBM's token ring network would also be suitable transfer buses, as would a subset of the SCSI bus or other buses. By "subset," the inventor means that some of the SCSI bus (or other bus) commands, SCSI bus signals, or SCSI bus commands and signals may not be needed by the secondary SCSI controller. To fully implement the SCSI bus, the primary SCSI controller would typically implement the entire SCSI protocol. However, the secondary SCSI controller may not need this full capability.

The examples presented in this specification are primarily those of the coprocessor transferring data from the DASD. However, the present invention also contemplates transferring data from the coprocessor to the DASD. For example, an audio coprocessor that is capable of digitizing and compressing an audio signal, as well as decompressing and generating analog signal from a digital signal, may be used in a system. While digitizing an audio signal, the audio coprocessor requires the transfer of large blocks of data to the DASD. Giving the coprocessor its own interface allows these large blocks of data to be transferred to the DASD without causing the CPU inactivity of the prior systems.

These and other objects and advantages of the present invention shall become more apparent from a detailed description of the invention.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below serve to example the principles of this invention.

FIGS. 1A and 1B are schematic block diagrams of prior art multimedia systems;

DETAILED DESCRIPTION OF THE PREFERRED EMBODIMENT

Figure 2A:
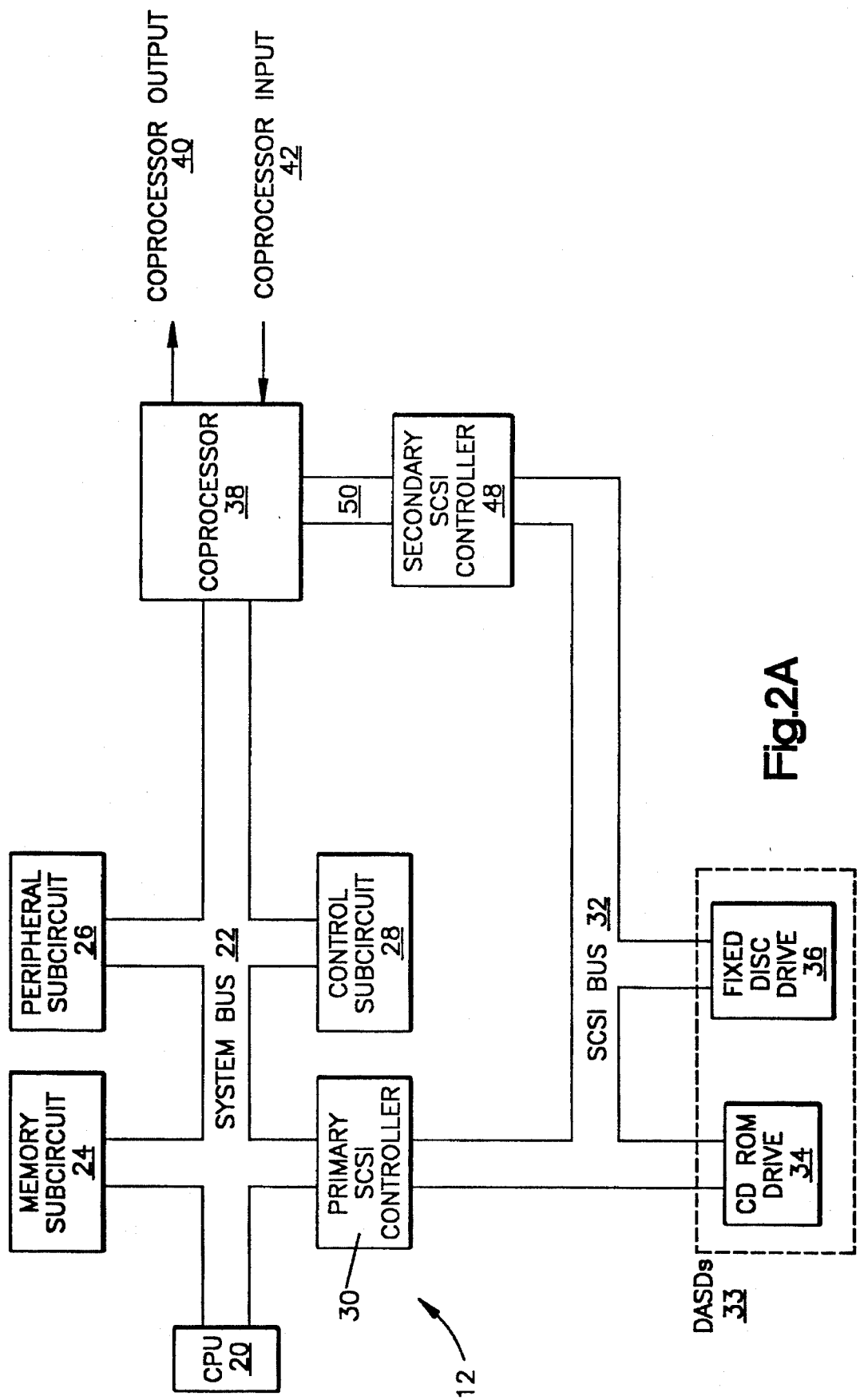
FIGS. 2A and 2B are schematic block diagrams of the multimedia personal computer system of the present invention in which the coprocessor has an associated secondary SCSI controller.

Before describing the details of the present invention, a description of a prior art multimedia computer system may be helpful in understanding the advantages of the present invention. Reference is had, therefore, to FIGS. 1A and 1B, which show a prior art multimedia computer system 10.

The prior art computer system 10 has a CPU 20 with a system bus 22 associated therewith. The system bus 22 is very broad, comprising the signals necessary for communication between the CPU 20, the memory subcircuit 24, the peripheral subcircuit 26, the control subcircuit 28, the primary SCSI controller 30, and the coprocessor 38 and includes all data signals, address signals, timing signals, chip select signals, busmaster signals, and other signals necessary for such communication.

The prior art computer system 10 typically also has a memory subcircuit 24, a peripheral subcircuit 26, and a control subcircuit 28. The memory subcircuit 24 will typically comprise volatile and/or non-volatile memory required by the system, including any RAM, BIOS ROM, and cache memory required by the CPU 20. The peripheral subcircuit 26 will typically include the circuitry necessary for the system to use a keyboard, communicate with devices serially using a protocol such as RS-232C, or communicate via a parallel interface, such as the typical Centronics printer protocol. The control subcircuit 28 will typically comprise those subcircuits necessary to the functioning of the prior art computer system 10, such as those subcircuits generating chip selects, DMA subcircuits, and busmaster, arbitration, and timing subcircuits, just to name a few.

The prior art computer system 10 also has a primary SCSI controller 30, which generates the SCSI bus 32. The SCSI bus 32 connects one or more direct access storage devices (DASDs) 33, such as CD ROM drive 34 and fixed disk drive 36, to the primary SCSI controller 30, allowing data to be transferred to and from the CPU 20 via the system bus 22. The prior art computer system 10 also has a coprocessor 38 connected to the CPU 20 via the system bus 22. The coprocessor 38 has an associated output 40 and an associated input 42. The coprocessor output 40 may be one or more of any of a number of signals, such as a video signal, an audio signal, a composite audio/video signal, or a network signal, to name but a few. Likewise, the coprocessor input 42 may be one or more of any of a number of signals, such as a video signal, an audio signal, a composite audio/video signal, or a network signal, to name but a few. The coprocessor 38 may include any signal conditioning necessary to interface the coprocessor output 40 to hardware devices, such as a monitor, a speaker, or a network coaxial cable. Likewise, the coprocessor 38 may include any signal conditioning circuitry necessary to interface the coprocessor input signal 42, such as an audio signal, a video signal, a composite audio/video signals or a network signal, to the coprocessor 38.

The primary SCSI controller 30 generates the SCSI bus 32, which allows the CPU 20 to communicate with the various DASDs 33, such as the CD ROM drive 34 and the fixed disk drive 36.

The CPU 20 typically runs programs from the memory subcircuit 24. These programs are transferred from the DASDs 33, such as CD ROM drive 34 and fixed disk drive 36, via the SCSI bus 32, through the primary SCSI controller 30, and via the system bus 22 to the memory subcircuit 24. While running such programs, the CPU 20 typically gathers data and/or control commands from the peripheral subcircuit 26 via the system bus 22. Thus for the most part, the CPU 20 runs programs from the memory subcircuit 24, gathering data and control inputs from the peripheral subcircuit 26 via the system bus 22, without needing to access the DASDs 33 via the SCSI bus 32.

Referring now to FIG. 1A, the CPU 20 communicates with the coprocessor 38 via the system bus 22. As previously discussed, there are several ways that the large amounts of data, needed by the multimedia system, may be transferred from the DASDs 33, such as the CD ROM drive 34 and the fixed disk drive 36, to the coprocessor 38. One such way of transferring data is to have the CPU 20 control the primary SCSI controller 30 via the system bus 22. The primary SCSI controller 30 then transfers the data from the DASDs 33 via the SCSI bus 32. This data is then transferred by the CPU 20 from the primary SCSI controller 30 via the system bus 22 to the coprocessor 38. The coprocessor 38 then decompresses the compressed data and generates the necessary coprocessor output 40. This method of transfer ties up both the CPU 20 and the system bus 22 during the transfers, preventing the CPU 20 from running any other programs in the memory subcircuit 24 and preventing the CPU 20 from gathering data and control information from the peripheral subcircuit 26.

Another prior art method of transferring the data is shown in FIG. 1B. In the system of FIG. 1B, the coprocessor has associated with it a busmaster circuit 44 inserted in series between CPU 20, along system bus 22, and the coprocessor 38, along a secondary bus 46. The busmaster subcircuit 44 arbitrates control of the system bus 22 between the CPU 20 and the coprocessor 38, thereby allowing the coprocessor 38 to assume control of the system bus 22 when the CPU isolates itself from the system bus 22. When the coprocessor 38 controls the system bus 22, the coprocessor 38 can control the primary SCSI controller 30 via the secondary bus 46 and the system bus 22. The coprocessor 38 may then instruct the primary SCSI controller 30 to collect data from the various DASDs 33, such as the CD ROM drive 34 and the fixed disk drive 36, via the SCSI bus 32. The coprocessor 38 then transfers the data from the primary SCSI controller 30 via the system bus 22 and the secondary bus 46. The coprocessor 38 then releases the system bus 22, decompresses the data, and generates the coprocessor output 40. In this configuration, the CPU 20 is not used to transfer the data between the DASDs 33 and the coprocessor 38; however, the CPU 20 cannot run a program from the memory subcircuit 24 or collect data and control inputs from the peripheral subcircuit 26 because the system bus 22 is being controlled by the coprocessor 38.

Figure 2B:
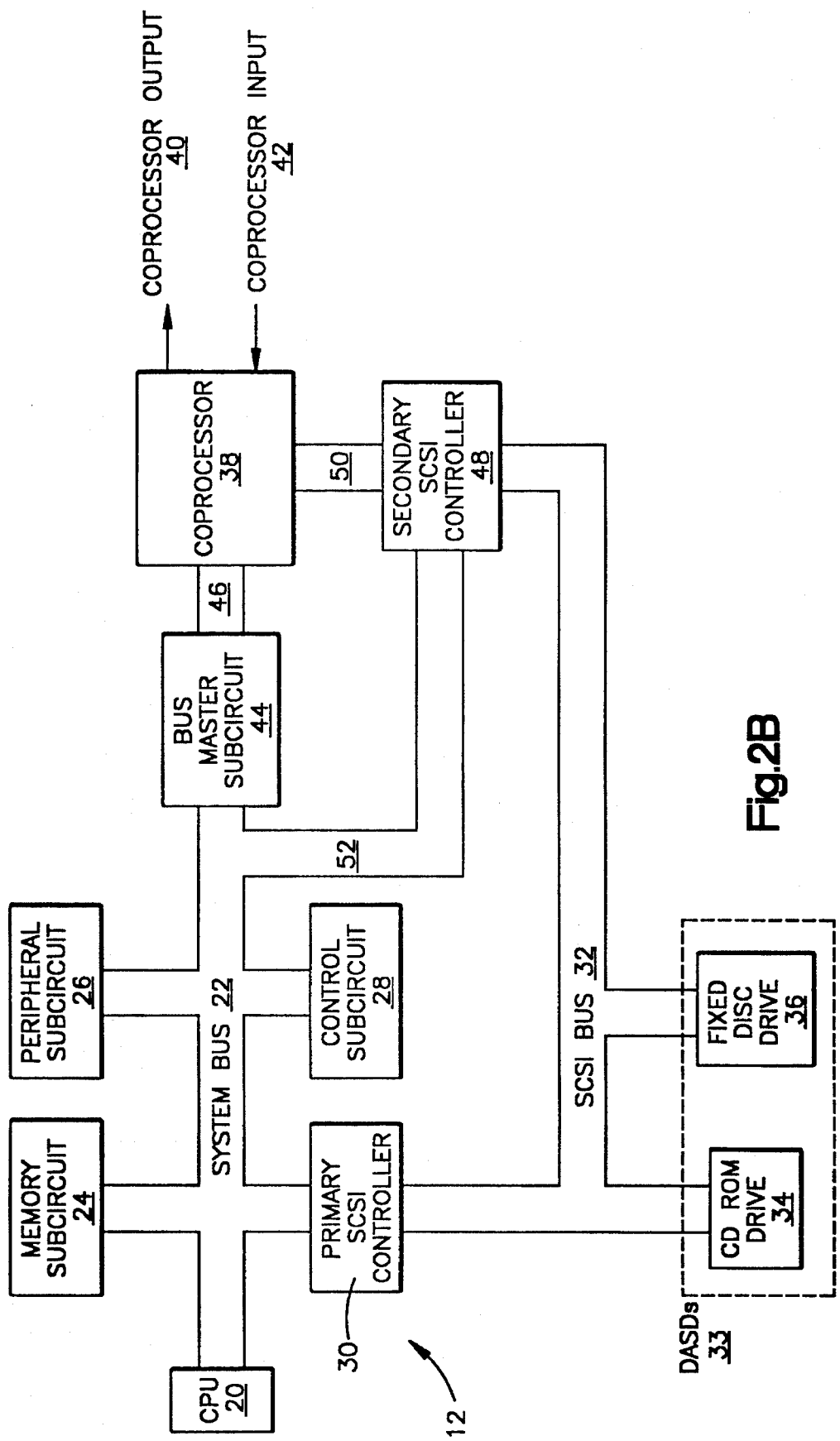

Referring now to the present invention, FIGS. 2A and 2B show a computer system 12 that makes use of the internally shared SCSI bus of the present invention. The computer system 12 of the present invention has a CPU 20 with a system bus 22 associated therewith. The system bus 22 is very broad, comprising the signals necessary for communication between the CPU 20, the memory subcircuit 24, the peripheral subcircuit 26, the control subcircuit 28, the primary SCSI controller 30, and the coprocessor 38 and includes all data signals, address signals, timing signals, chip select signals, busmaster signals, and other signals necessary for such communication.

The computer system 12 typically also has a memory subcircuit 24, a peripheral subcircuit 26, and a control subcircuit 28. The memory subcircuit 24 will typically comprise volatile and/or non-volatile memory required by the system, including any RAM, BIOS ROM, and cache memory required by the CPU 20. The peripheral subcircuit 26 will typically include the electrical hardware necessary for the system to use a keyboard, communicate with devices serially using a protocol such as RS-232C, or communicate via a parallel interface, such as a typical Centronics interface. The control subcircuit 28 will typically comprise those subcircuits necessary to the functioning of the computer system 12 such as those subcircuits generating chip selects, DMA subcircuits, and busmaster, arbitration, and control subcircuits, just to name a few. The computer system 12 also has a primary SCSI controller 30, which generates the SCSI bus 32. The SCSI bus 32 connects one or more DASDs 33, such as a CD ROM drive 34 and a fixed disk drive 36 to the CPU 20 to the primary SCSI controller 30.

The computer system 12 also has a coprocessor 38 connected to the CPU 20 via the system bus 22. The coprocessor 38 has a secondary SCSI controller 48 associated with it. The coprocessor 38 communicates with the secondary SCSI controller 48 via a secondary controller bus 50. The secondary controller bus 50 may have some signals in common with the system bus 22. For example, the secondary SCSI controller 48 may require certain timing signals, such as a fixed frequency square wave, provided by the system bus 22. The critical feature of the secondary controller bus 50 is that it not share any signals with the system bus 22 that would cause any communication between the coprocessor 38 and the secondary SCSI controller 48 to interfere with the CPU's 20 ability to perform its functions, such as running a program from the memory subcircuit 24, transferring data from the peripheral subcircuit 26, or accessing the primary SCSI controller 30.

The secondary SCSI controller 48 is also connected to the DASDs 33, such as the CD ROM drive 34 and the fixed disk drive 36, via the SCSI bus 32, in such a way that the coprocessor 38 may transfer data to, from, or to and from the DASDs 33, via the SCSI bus 32. Data will typically flow either (i) from the coprocessor 38 to the secondary SCSI controller 48 via the secondary transfer bus 50 and then from the secondary SCSI controller 48 to the DASDs 33 via the SCSI bus 32, or (ii) from the DASDs 33 to the secondary SCSI controller 48 via the SCSI bus 32 and then from the secondary SCSI controller 48 to the coprocessor 38 via the secondary transfer bus 50.

The coprocessor 38 has an associated coprocessor output 40 and an associated coprocessor input 42. The coprocessor output 40 may be one or more of any of a number of signals, such as a video signal, an audio signal, a composite audio/video signal, or a network signal, to name but a few. Likewise, the coprocessor input 42 may be one or more of any of a number of signals, such as a video signal, an audio signal, a composite audio/video signal, or a network signal, to name but a few. The coprocessor 38 may include any signal conditioning necessary to interface the coprocessor output 40 to hardware devices such as a computer monitor, a speaker, or a network coaxial cable. Likewise, the coprocessor 38 may include any signal conditioning circuitry necessary to interface the coprocessor input signal 42, such as an audio signal, a video signal, a composite audio/video signal, or a network signal, to the coprocessor 38.

The CPU 20 typically runs programs from the memory subcircuit 24. These programs are transferred from the DASDs 33, such as the CD ROM drive 34 and the fixed disk drive 36, via the SCSI bus 32, through the primary SCSI controller 30, and via the system bus 22 to the memory subcircuit 24. While running such programs, the CPU 20 typically gathers data and/or control commands from the peripheral subcircuit 26 via the system bus 22. Thus, for the most part, the CPU 20 runs programs from the memory subcircuit 24, gathering data and control inputs from the peripheral subcircuit 26, via the system bus 22, without needing to access the DASDs 33 via the SCSI bus 32.

In the present invention, transfers from the DASDs 33, such as the CD ROM drive 34 and the fixed disk drive 36, to the coprocessor 38 are made in such a way that the CPU 20 may continue to run programs in the memory subcircuit 24 and continue to collect data and control input from the peripheral subcircuit 26 via the system bus 22. The coprocessor 38 transfers data as follows: the coprocessor 38 instructs the secondary SCSI controller 48, via the secondary controller bus 50, to transfer a certain block or blocks of data from the DASDs 33. The secondary SCSI controller 48 then assumes control of the SCSI bus 32 and makes the transfers from the DASDs 33 via the SCSI bus 32. The data is then transferred from the secondary SCSI controller 48, via the secondary controller bus 50, back to the coprocessor 38, which decompresses the data and generates the coprocessor output 40.

Notice that the flow of data from the DASDs 33 to the coprocessor 38 does not involve the primary SCSI controller 30, the system bus 22, or the CPU 20. Therefore and critically, while the coprocessor 38 is receiving data from the DASDs 33 via the SCSI bus 32, through the secondary controller 48 and via the secondary controller bus 50, the CPU 20 may continue to run a program from the memory subcircuit 24 and continue to receive data and control input from the peripheral subcircuit 26. The CPU 20 is only prevented from using the SCSI bus 32 through the primary SCSI controller 30 while the secondary SCSI controller 48 is transferring the data via SCSI bus 32.

The CPU 20 communicates to the coprocessor 38 via the system bus 22. The level of communication between the CPU 20 and the coprocessor 38 will depend upon the specific applications. For example, commands to and the status of the coprocessor 38 may be communicated via a single I/O port associated with the coprocessor 38.

In the preferred embodiment, the secondary SCSI controller 48 connects to the coprocessor 38, but the secondary SCSI controller 48 is not connected to the CPU 20 via the system bus 22. However, as long as the coprocessor 38 is able to control the secondary SCSI controller 48 in such a manner that data may be transferred across the SCSI bus 32 to the coprocessor 38 without interfering with the CPU's actions on the system bus 22 and its functions in the memory subcircuit 24 and the peripheral subcircuit 26, a communication link between secondary SCSI controller 40 and CPU 20 is permissible. For example, as shown in FIG. 2B, an extension 52 of system bus 22 is permissible, such that the CPU 20 may use the secondary SCSI controller 48 to access the DASDs 33 on the SCSI bus 32 via system bus 22. Thus, the CPU 20 may use the secondary SCSI controller 48 as a redundant controller if the primary SCSI controller 30 fails.

In describing the present invention, only one coprocessor has been illustrated. However, the invention also contemplates multiple coprocessors in a system, each with its own SCSI controller, or multiple coprocessors sharing the single secondary SCSI controller 48.

For example, the system could comprise an RS/6000 system with an IBM 801 processor as the CPU 20. The system bus 22 would be the Micro Channel Architecture with streaming data mode. The primary SCSI controller 30 could be a streaming-data capable 32-bit busmaster SCSI adapter for the Micro Channel. One coprocessor 38 could be the IBM XGA busmaster chipset, with digital video interactive (DVI) data compression and decompression. The coprocessor input 42 for this coprocessor would be the video signal separated from a composite audio/video signal, separated by common means. The coprocessor output 40 would be the signals necessary to drive an XGA monitor. Another coprocessor could be the busmaster-capable Texas Instruments MWave digital signal processor (DSP). The coprocessor input would be the audio signal separated from a composite audio/video signal, separated by common means. The coprocessor output 40 would be an audio signal suitable for being driven by a speaker with a built-in audio amplifier. These two coprocessors could each have their own associated secondary SCSI controller 48 or they could share a single secondary SCSI controller 48. One example of a SCSI controller 48 believed to be suitable for this use is the Adaptec 6260 SCSI controller chip. Zilog is also believed to supply several suitable SCSI controller chips. Obviously, each SCSI controller must be assigned its own address on the SCSI bus. The direct access storage devices 33 could be any suitable SCSI compatible CD ROM drive and fixed disk drive. The IBM-Rochester 320 MB SCSI fixed disk drive is believed to be a suitable fixed disc drive. In this example, the coprocessors and their associated hardware would be designed into an Micro Channel adapter card and each SCSI device connected to the SCSI bus by a daisy-chained ribbon cable.

For the purpose of describing this invention, the CPU 20, the coprocessor 38, the primary SCSI controller 30, and the secondary SCSI controller 48 are referred to as though they were a single chip. This may be the case. However, the CPU 20, the coprocessor 38, the primary SCSI controller 30, and the secondary SCSI controller 48 may also comprise more than one chip, and/or be partially merged within one-another. For example, the coprocessor 38 may have an integral SCSI controller, which would become the secondary SCSI controller 48. In that example the secondary SCSI controller 48 and the secondary controller bus 50 would be internal to the coprocessor 38. As another example, the primary SCSI controller 30 and the secondary SCSI controller 48 are merged into a single chip. This dualport SCSI controller would function similarly to a dualport RAM, which is well known in the art, essentially giving both the CPU 20 and the coprocessor 38 access to a single SCSI controller through two independent SCSI controller interfaces. In that case, the first interface and the SCSI controller would comprise the primary SCSI controller 30. Likewise, the second interface and the SCSI controller would comprise the secondary SCSI controller 48.

For the purposes of describing this invention, the system bus 22 and the transfer bus 32 have been described as electronic buses and the individual components have been described as electronic devices. However, this invention is intended to be broad enough to encompass optical buses, such as the proposed "FiberChannel" specification. In addition, the individual components may be optically-based devices.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, as shown in FIG. 2B, the computer system 12 of the present invention may also have a busmaster subcircuit 44 that arbitrates control of the system bus 22 between the CPU 20 and the coprocessor 38, thereby allowing the coprocessor 38 to assume control of the system bus 22. Therefore, the invention in its broader aspects is not limited to the specific details, representative apparatus and method, and illustrative examples shown and described. Accordingly, departures may be made from such details without departing from the spirit or scope of the applicant's general inventive concept.

I claim:

1. A computer system comprising:

a system bus having connected thereto at least a central processing unit (CPU), a coprocessor for receiving coprocessing commands from said CPU over said system bus, and at least one subcircuit for providing data to said CPU over said system bus, said system bus including system bus data signals and system bus address signals;

a primary bus controller connecting said system bus to a transfer bus, said transfer bus having a storage device connected thereto, said transfer bus including transfer bus data signals and transfer bus address signals; and a secondary transfer bus controller for transferring data between said coprocessor and said storage device, independently of said system bus, simultaneously while said CPU is receiving data from said subcircuit over said system bus, said secondary transfer bus controller connected to said storage device by said transfer bus and connected to said coprocessor by a secondary transfer bus, said secondary transfer bus including secondary transfer bus data signals and secondary transfer bus address signals.

2. The computer system of claim 1, wherein said at least one subcircuit comprises a memory subcircuit, said memory subcircuit containing programs which are executed by said CPU and which are transferred to said memory subcircuit from said primary bus controller over said system bus, and to said primary bus controller from said storage device over said transfer bus.

3. The computer system of claim 2, wherein said at least one subcircuit further comprises a peripheral subcircuit providing input data to be read by said CPU over said system bus.

4. The computer system of claim 2, wherein said storage device comprises a direct access storage device.

5. The computer system of claim 4, wherein said direct access storage device comprises a compact disc read only memory (CD ROM) device.

6. The computer system of claim 4, wherein said direct access storage device comprises a fixed disc drive.

7. The computer system of claim 1, wherein said transfer bus conforms to small computer system interface (SCSI) bus standard.

8. The computer system of claim 7, wherein said transfer bus comprises a subset of said SCSI bus standard.

9. The computer system of claim 1, wherein said transfer bus conforms to a general purpose interface bus (GPIB) standard.

10. The computer system of claim 9, wherein said transfer bus comprises a subset of said GPIB standard.

11. The computer system of claim 1, wherein said transfer bus comprises a single wire serial network bus.

12. An auxiliary transfer bus controller mechanism for a computer system comprising (i) a system bus having connected thereto at least a central processing unit (CPU), a coprocessor for receiving coprocessing commands from said CPU over said system bus, and at least one subcircuit for providing data to said CPU over said system bus, said system bus including system bus data signals and system bus address signals; and (ii) a transfer bus connected to said system bus by a primary transfer bus controller, said transfer bus including transfer bus data signals and transfer bus address signals, said transfer bus having a storage device connected thereto; said auxiliary transfer bus controller mechanism comprising:

a secondary transfer bus controller for transferring data between said coprocessor and said storage device, independently of said system bus, simultaneously while said CPU is receiving data from said subcircuit over said system bus, said secondary transfer bus controller connected to said storage device by said transfer bus; and a secondary transfer bus connecting said secondary transfer bus controller to said coprocessor, said secondary transfer bus including secondary transfer bus data signals and secondary transfer bus address signals.

13. The auxiliary transfer bus controller of claim 12, wherein said at least one subcircuit comprises a memory subcircuit, said memory subcircuit containing programs which are executed by said CPU and which are transferred to said memory subcircuit from said primary bus controller over said system bus, and to said primary bus controller from said storage device over said transfer bus.

14. The auxiliary transfer bus controller of claim 12, wherein said transfer bus conforms to small auxiliary transfer bus controller interface (SCSI) bus standard.

15. The auxiliary transfer bus controller of claim 14, wherein said transfer bus comprises a subset of said SCSI bus standard.

16. The auxiliary transfer bus controller of claim 12, wherein said transfer bus conforms to a general purpose interface bus (GPIB) standard.

17. The auxiliary transfer bus controller of claim 16, wherein said transfer bus comprises a subset of said GPIB standard.

18. The auxiliary transfer bus controller of claim 12, wherein said transfer bus comprises a single wire serial network bus.

* * * * *